US009499114B2

(12) United States Patent
Gross et al.

(10) Patent No.: US 9,499,114 B2
(45) Date of Patent: Nov. 22, 2016

(54) SYSTEM AND METHOD FOR MONITORING VEHICLE SPEED AND DRIVER NOTIFICATION

(71) Applicant: Gentex Corporation, Zeeland, MI (US)

(72) Inventors: Michael A. Gross, Bietigheim-Bissingen (DE); David M. Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/190,524

(22) Filed: Feb. 26, 2014

(65) Prior Publication Data

US 2014/0244111 A1 Aug. 28, 2014

Related U.S. Application Data

(60) Provisional application No. 61/769,893, filed on Feb. 27, 2013.

(51) Int. Cl.
*B60R 21/00* (2006.01)
*B60W 50/14* (2012.01)

(52) U.S. Cl.
CPC .............. *B60R 21/00* (2013.01); *B60W 50/14* (2013.01); *B60W 2050/146* (2013.01); *B60W 2520/10* (2013.01); *B60W 2550/12* (2013.01); *B60W 2550/402* (2013.01)

(58) Field of Classification Search
CPC ...... G08G 1/04; G08G 1/09626; G08G 1/168
USPC .......... 701/31.4, 36, 41, 93; 340/425.5, 435, 340/905, 917; 303/159, 171, 176, 190
See application file for complete search history.

(56) References Cited

U.S. PATENT DOCUMENTS

| | | | |
|---|---|---|---|
| 5,978,724 A * | 11/1999 | Sekine | ........................... 701/70 |
| 6,553,130 B1 | 4/2003 | Lemelson et al. | |
| 7,146,272 B2 | 12/2006 | Yanagidaira et al. | |
| 7,177,750 B2 | 2/2007 | Schroder | |
| 7,421,334 B2 | 9/2008 | Dahlgren et al. | |
| 7,660,658 B2 | 2/2010 | Sheynblat | |
| 7,840,342 B1 | 11/2010 | Breed | |
| 7,911,361 B2 | 3/2011 | Kumabe | |
| 8,064,643 B2 | 11/2011 | Stein et al. | |

(Continued)

FOREIGN PATENT DOCUMENTS

| | | |
|---|---|---|
| DE | 102011117478 | 5/2012 |
| KR | 100784863 | 12/2007 |

OTHER PUBLICATIONS

Nicole Geissler, Combined Technologies from Continental and Mobileye Support the New Speed Limit Information of the New BMW 7 Series, MobileEye/BMW, Aug. 12, 2008, Germany.

(Continued)

*Primary Examiner* — Jelani Smith
(74) *Attorney, Agent, or Firm* — Price Heneveld LLP; Bradley D. Johnson

(57) ABSTRACT

A vehicle speed monitoring system and method is provided that determines a speed threshold based on provided inputs from various vehicle systems and measures the speed threshold against the current driving speed. In the event the threshold speed is exceeded, the system notifies the driver and/or makes a recommendation depending on the present driving conditions.

16 Claims, 4 Drawing Sheets

(56) References Cited

U.S. PATENT DOCUMENTS

| | | | |
|---|---|---|---|
| 8,090,153 B2 | 1/2012 | Schofield et al. | |
| 8,625,815 B2* | 1/2014 | DeLine | 296/1.11 |
| 2002/0105423 A1* | 8/2002 | Rast | 340/479 |
| 2003/0154014 A1* | 8/2003 | Iwata et al. | 701/93 |
| 2005/0232469 A1* | 10/2005 | Schofield et al. | 382/104 |
| 2007/0027583 A1* | 2/2007 | Tamir et al. | 701/1 |
| 2007/0031006 A1* | 2/2007 | Leleve | B60Q 1/1423 382/104 |
| 2007/0132563 A1* | 6/2007 | Balbale et al. | 340/435 |
| 2007/0213883 A1* | 9/2007 | Clarke et al. | 701/1 |
| 2007/0230800 A1* | 10/2007 | Miyahara | G06K 9/00798 382/224 |
| 2008/0243350 A1 | 10/2008 | Harkness | |
| 2010/0023183 A1* | 1/2010 | Huang | B60W 30/12 701/1 |
| 2010/0045452 A1* | 2/2010 | Periwal | B60Q 9/00 340/439 |
| 2010/0209887 A1* | 8/2010 | Chin et al. | 434/65 |
| 2010/0211270 A1* | 8/2010 | Chin et al. | 701/44 |
| 2011/0043377 A1* | 2/2011 | McGrath | G08G 1/09675 340/905 |
| 2013/0338962 A1* | 12/2013 | Crandall | G01P 13/00 702/142 |
| 2014/0032094 A1* | 1/2014 | Heinrichs-Bartscher | B60T 7/22 701/301 |

OTHER PUBLICATIONS

Vladimir Roumenov Glavtchev, EU Speed-limit Sign Detection Using a Graphics Processing Unit, University of California at Davis, Dec. 2009.

Patent Cooperation Treaty, International Searching Authority, International Search Report, Written Opinion of the International Searching Authority and Notification of Transmittal, Jul. 3, 2014, 7 Pages.

* cited by examiner

SYSTEM AND METHOD FOR MONITORING VEHICLE SPEED AND DRIVER NOTIFICATION

CROSS REFERENCE TO RELATED APPLICATION

This application claims priority to and the benefit under 35 U.S.C. §119(e) of U.S. Provisional Patent Application No. 61/769,893, filed on Feb. 27, 2013, entitled "VEHICLE SPEED MONITORING SYSTEM WITH DRIVER NOTIFICATION," the entire disclosure of which is hereby incorporated herein by reference.

FIELD OF THE INVENTION

The present invention generally relates to a vehicle speed monitoring system. The present invention provides a speed monitoring system making speed-related notifications and recommendations.

SUMMARY OF THE INVENTION

According to one aspect of the present invention, a system for monitoring the speed of a controlled vehicle driven by a driver is provided. The system includes at least one vehicle system configured to provide data based on current driving conditions. A controller is configured to receive and analyze the data and to generate a speed threshold. The controller is further configured to modify the speed threshold when the data indicates that a low visibility condition is present, compare the speed threshold with the current driving speed of the controlled vehicle, and provide at least one of a notification and recommendation to the driver if the current driving speed exceeds the speed threshold.

According to another aspect of the present invention, a method for monitoring the speed of a controlled vehicle is provided. The method includes providing data based on current driving conditions, receiving and analyzing the data in a controller to generate a speed threshold, modifying the speed threshold when the data indicates that a low visibility condition is present, comparing the speed threshold with the current driving speed of the vehicle, and providing at least one of a notification and recommendation if the current driving speed exceeds the speed threshold.

According to another aspect of the present invention, a non-transitory computer readable medium is provided. The non-transitory computer readable medium has software instructions stored thereon that are executed by a processor. The software instructions include providing data based on current driving conditions, receiving and analyzing the data in a controller to generate a speed threshold, modifying the speed threshold when the data indicates that a low visibility condition is present, comparing the speed threshold with the current driving speed of the vehicle, and providing at least one of a notification and recommendation if the current driving speed exceeds the speed threshold.

These and other aspects, objects, and features of the present invention will be understood and appreciated by those skilled in the art upon studying the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
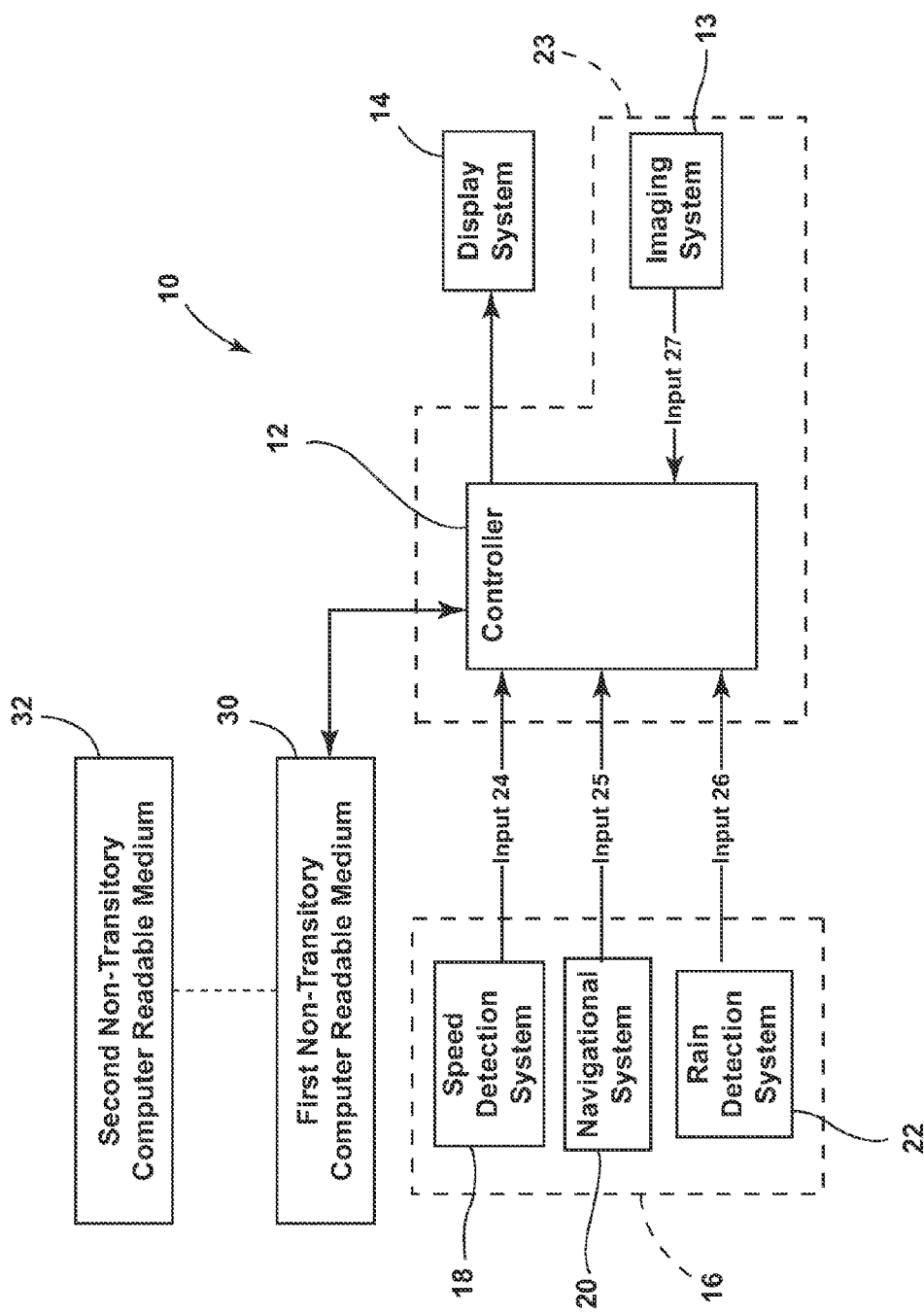
FIG. 1 is a block diagram of a vehicle speed monitoring system according to one embodiment of the present invention.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to a system for monitoring the speed of a controlled vehicle in response to image data acquired from an imaging system and, optionally, data from other vehicle systems and equipment. From the acquired data, the system may provide the driver with speed-related information including notifications when the driver is speeding and/or making recommendations of a safe driving speed depending on current driving conditions. The information may be communicated to the driver via one or more display systems in the vehicle.

It is generally known to provide a forward-facing camera in a vehicle to detect traffic signs and to employ character-recognition software to extract the speed limit from speed limit signs for informing the driver of the speed limit for that road. However, speed limit signs are not always present when a vehicle first enters a road if at all, and such systems are expensive and relatively complex.

Referring now to FIG. 1, a general embodiment of the speed monitoring system 10 is shown, and includes a controller 12 that can communicate with an imaging system 13, a display system 14, and optionally, other vehicle equipment 16 that can include, but is not limited to, a speed detection system 18, a navigational system 20, and/or a rain detection system 22. According to one embodiment, the controller 12 can include the controller from preexisting vehicle control systems such as an exterior light control system 23 since these and other types of control systems routinely employ imaging systems (e.g. imaging system 13) and are already predisposed to communicate with other vehicle systems and features. Examples of such control systems are described in the U.S. Pat. Nos. 5,837,994, 5,990,469, 6,008,486, 6,049,171, 6,130,421, 6,130,448, 6,166,698, 6,255,639, 6,379,013, 6,403,942, 6,587,573, 6,593,698, 6,611,610, 6,631,316, 6,653,614, 6,728,393, 6,774,988, 6,861,809, 6,906,467, 6,947,577, 7,321,112, 7,417,221, 7,565,006, 7,567,291, 7,653,215, 7,683,326, 7,881,839, 8,045,760, 8,120,652, and 8,543,254, the entire disclosures of which are incorporated herein by reference.

With respect to the present system 10, the imaging system 13 may be any conventional system that includes a multi-functional image sensor. Examples of suitable imaging systems are disclosed in U.S. Pat. No. 8,289,430 and in United States Patent Application Publication No. US 20120072080 A1, and in U.S. patent application Ser. No. 13/530,947 entitled "IMAGER SYSTEM WITH MEDIAN FILTER AND METHOD THEREOF" filed on Jun. 22, 2012, by Jon H. Bechtel et al. and Ser. No. 13/671,843 entitled "HIGH DYNAMIC RANGE CAMERA LOW LIGHT LEVEL FILTERING" filed on Nov. 8, 2012, by Jon H. Bechtel et al., the entire disclosures of which are incorporated herein by reference.

As shown in FIG. 1, the imaging system 13 and other vehicle systems 16 may provide various data inputs (see 24-27) to the controller 12 based on current driving conditions. The controller 12 is configured to receive and analyze the data to generate a speed threshold, which is intended to typically correspond to the speed limit for the road on which the vehicle is travelling, but may also change when certain driving conditions arise.

The method for monitoring the speed of a controlled vehicle will now be described herein with reference to FIG. 2. This method is described below as being implemented by controller 12 and can use data received from the imaging system 13 and/or the other vehicle equipment 16 shown in FIG. 1. This method may be a subroutine executed by any processor, and thus this method may be embodied in a non-transitory computer readable medium having stored thereon software instructions that, when executed by a processor, cause the processor to execute the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable medium 30 of controller 12 (or locally associated with controller 12 or some other processor) typically prior to being installed in a vehicle, from a second non-transitory computer readable medium 32 located remote from first non-transitory computer readable medium 30 (See FIG. 1). Second non-transitory computer readable medium 32 may be in communication with first non-transitory computer readable medium 30 by any suitable means, which may at least partially include the Internet or a local or wide area wired or wireless network.

Figure 2:
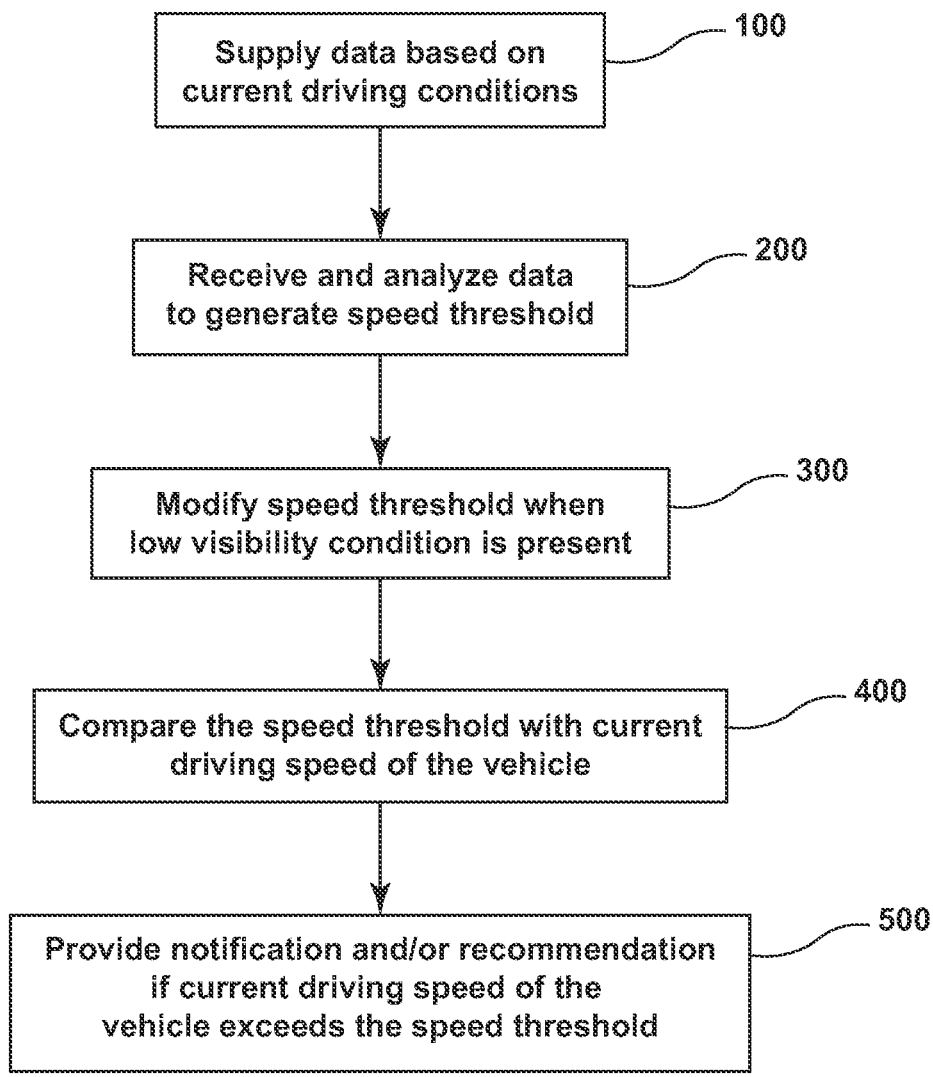
FIG. 2 is a flow chart illustrating a method of monitoring vehicle speed, according to one embodiment of the present invention.

FIG. 2 shows a general flow chart illustrating various steps to be executed by the controller 12. For purposes of simplicity, the steps shown in the flow chart are presented and described herein in a linear manner. However, it should be appreciated that some steps can be performed concurrently with others and/or be executed in a different order. As shown in step 100, the controller 12 is supplied with data based on current driving conditions and in step 200, the controller 12 receives and analyzes the data to generate a speed threshold. As should be appreciated, the data provided to the controller 12 will naturally vary depending on the type of vehicle equipment available to the controller 12. For instance, as previously mentioned, the controller 12 may be part of an exterior light control system 23. In this arrangement, the imaging system 13 can be used to provide the controller 12 with a variety of input (e.g. via input 27) relating to whether the vehicle is travelling on a motorway, country road, or city street. Examples of exterior light control systems that determine when the vehicle is traveling in a village, city, motorway, or on a particular road type are disclosed in U.S. Pat. Nos. 6,861,809, 7,565,006, 8,045,760, and 8,543,254, United States Patent Application Publication No. 2013/0320193, and U.S. patent application Ser. No. 14/095,518, entitled "IMAGING SYSTEM AND METHOD FOR DETECTING A BRIGHT CITY CONDITION," and filed on Dec. 3, 2013 by Peter A. Liken, and Ser. No. 14/095,496, entitled "IMAGING SYSTEM AND METHOD FOR DETECTING A WINDING ROAD," and filed on Dec. 3, 2013 by Peter A. Liken, the entire disclosures of which are incorporated herein by reference.

According to one embodiment, the speed threshold may be selected based upon the determination of where the vehicle is traveling. For example, the controller 12 can determine the speed threshold based on the particular road type on which the vehicle is traveling (e.g. motorway, country road, city street, etc.) in addition to a region or country in which the vehicle is located (e.g. United states, Europe, Asia, etc.). The speed threshold may additionally or alternatively be obtained as a speed limit communicated by the navigational system 20 of the vehicle via input 25, and/or the imaging system 13 via input 27. Additionally or alternatively still, the controller 12 may determine the speed threshold based on a stopping distance that corresponds to a distance required to stop a vehicle when an obstacle has been perceived. For purposes of illustration, and not limitation, the following stopping distance equation can be used to calculate the stopping distance:

$$D_s = vt_{pr} + \frac{v^2}{2\mu g}$$

wherein $D_s$ is the stopping distance, v is a vehicle speed, $t_{pr}$ is a perception to reaction time corresponding to an elapsed time in which a driver perceives an obstacle and reacts to it (e.g. applies the brakes), $\mu$ is a coefficient of friction, and g is the gravity of Earth.

By selecting appropriate values for the stopping distance $D_s$, perception to reaction time $t_{pr}$, and coefficient of friction $\mu$ for various driving conditions, the above equation can be solved for speed v, which can then be used as the speed threshold or determining the same.

In any of the instances described herein, the speed threshold may be impacted by a variety of inputs depending on current driving conditions. For example, the rain detection system 22 (e.g. a dedicated vehicle rain sensor) can provide rain information to the controller 12 via input 26 from which the presence of rain can be a factor in generating the speed threshold. When applicable, the imaging system 13 can provide the controller 12 with information related to the presence of fog and/or snow conditions via input 27. In fact, these are just a few of many possible inputs that can be communicated to the controller 12 via the imaging system 13 and many more can be made available. For example, imaging systems have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using image sensors for such purposes are disclosed in U.S. Pat. Nos. 5,837,994, 5,990, 469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. patent application Ser. No. 13/559,994 entitled "SYSTEM AND METHOD FOR PERIODIC LANE MARKER IDENTIFICATION AND TRACKING" and filed Jul. 27, 2012, by Brock R. Rycenga et al., the entire disclosures of which are incorporated herein by reference.

From this, it can be appreciated that a wide variety of inputs can be received by the controller 12 for generating the speed threshold. Furthermore, it should be appreciated that the inputs are not limited to data related to fixed information (e.g. posted speed limits), but can also include data that is dynamic, such as the presence of a low visibility condition (e.g. presence of rain, snow, or fog). Recognizing this, in situations where the controller 12 receives one or more inputs indicating the presence of a low visibility condition, the controller 12 can modify the speed threshold, as shown in step 300. The controller 12 tends to decrease the speed threshold when a low visibility is present and can do so dynamically with respect any of the embodiments described herein. Referring back to the stopping distance equation for purposes of illustration, the coefficient of friction $\mu$ can be a dynamic parameter that changes based on input supplied to the controller 12. As previously described, the input can be provided to the controller 12 from the imaging system 13 and/or other systems 16. However, it should be appreciated that the controller 12 can additionally or alternatively receive input from other vehicle equipment such as, but not limited to, anti-lock brake systems, windshield wipers, dynamic stability control systems, and/or climate control systems. In any event, when a low visibility condition is present, the coefficient of friction $\mu$ can be reduced accordingly, which in turn reduces the calculated speed when applying the stopping distance equation. This typically results in the controller 12 selecting a decreased speed threshold. Thus, by taking into account the presence of low visibility conditions, it is possible for the controller 12 to determine a speed threshold that is below the speed limit.

Once the speed threshold has been determined, the controller 12 can compare the speed threshold to the current driving speed of the vehicle as shown in step 400. The current speed of the vehicle can be provided by the speed detection system 18 via input 24. The speed detection system 18 can include any suitable speed measuring instrument such as a vehicle speedometer or other speed sensor that can be provided in the vehicle or separate thereof. The current speed of the vehicle can also be provided to the controller 12 by the imaging system 13 via input 27 to add redundancy or as an alternative to having to use the speed detection system 18. If the current driving speed of the vehicle exceeds the speed threshold, the controller 12 can provide a notification and/or recommendation, as shown in step 500. Optionally, the controller 12 can also provide a notification and/or recommendation when the vehicle speed exceeds the speed limit in instances where the speed limit and speed threshold are different. This notification and/or recommendation can be different or the same as that provided when the vehicle speed exceeds the speed threshold.

Figure 3:
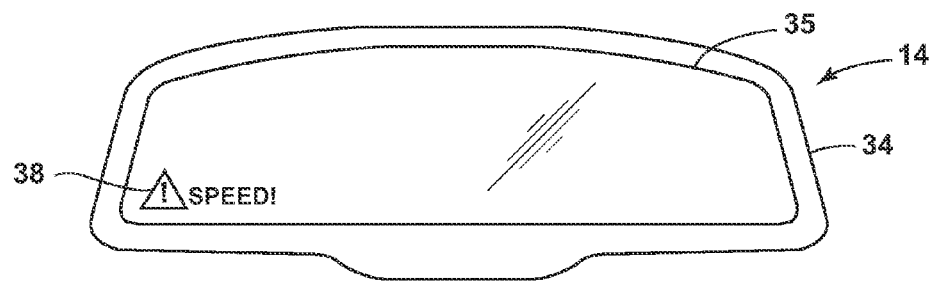
FIG. 3 is a frontal view of a rearview mirror assembly displaying a notification determined according to one embodiment of the present invention.
Figure 4:
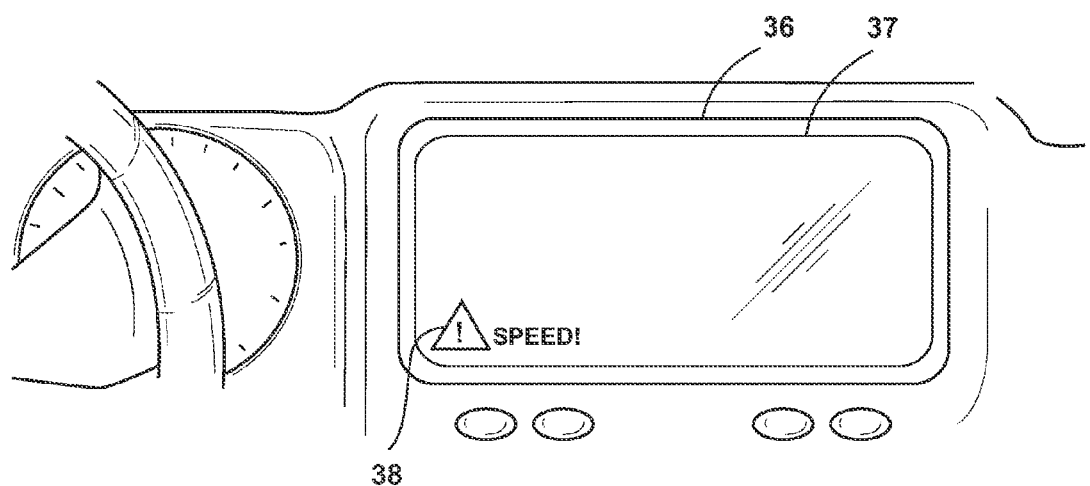
FIG. 4 is a frontal view of a dashboard display displaying a notification determined according to one embodiment of the present invention.
Figure 5:
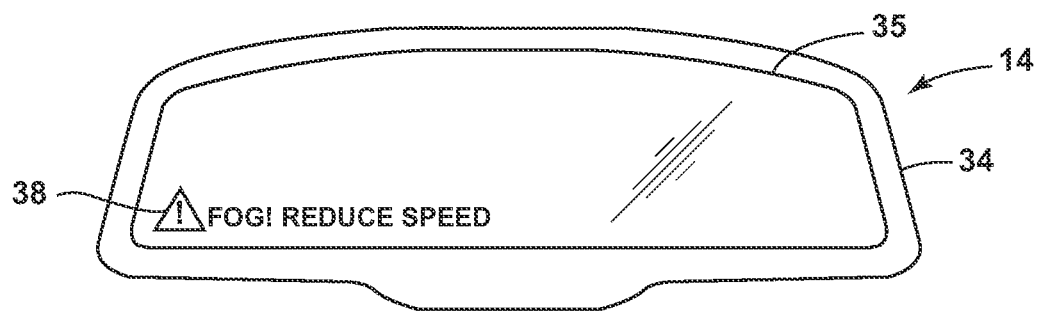
FIG. 5 is a frontal view of a rearview mirror assembly displaying a fog notification and a recommendation determined according to one embodiment of the present invention.

According to one embodiment, the notification and/or recommendation are shown on the display system 14, which can be a rearview mirror assembly 34 with display 35 or a dashboard display 36 with display 37, as shown in FIGS. 3 and 4, respectively. With respect to each embodiment, the controller 12 can prompt the rearview mirror assembly 34 and dashboard display 36 to display the notification and/or recommendation on associated displays 35 and 37, respectively. In each case, the corresponding display 35, 37 shows a notification warning the driver that the speed threshold and/or speed limit has been exceeded. As shown, the notification can include a warning icon 38 followed by text (Speed!) that alerts and informs the driver to a given condition. In FIG. 5, the rearview mirror assembly 34 is prompted to display a notification of a low visibility condition, such as fog in this case. As is additionally shown in FIG. 5, the rearview mirror assembly 34 can also be prompted to display a recommendation to the driver, which in the present case, corresponds to suggesting a reduction in speed.

Figure 6:
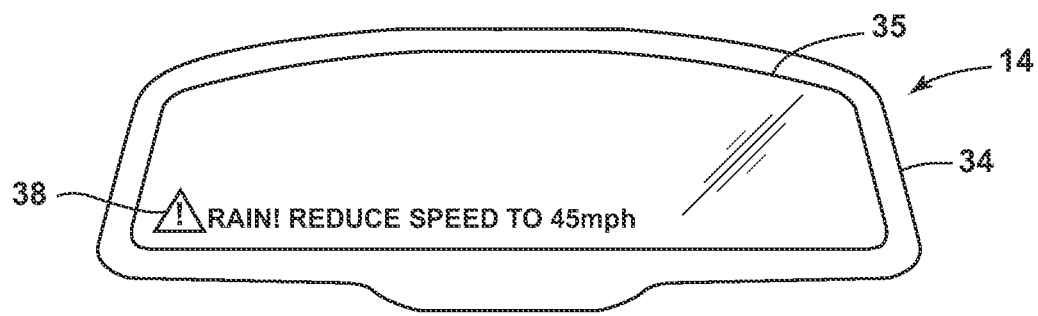
FIG. 6 is a frontal view of rearview mirror assembly displaying a rain notification and a recommendation determined according to one embodiment of the present invention.

With respect to any of the embodiments described herein, the controller 12 may be configured to determine a recommended speed based on the speed threshold, which can be displayed by the display system 14, either as a separate notification or in conjunction with other types of notifications including those previously described. For example, as shown in FIG. 6, the rearview mirror assembly 34 is prompted to display a notification that rain is present accompanied by a recommendation to reduce driving speed to the recommended speed of 45 miles per hour. The present invention also contemplates using an audio system of the vehicle to provide auditory notifications and/or recommendations, including those described herein, to further ensure that the driver is made aware of a breach of the speed limit, a potentially dangerous driving condition, and/or a safe speed recommendation in case the driver is not paying attention to the display systems 14. Furthermore, it is recognized that tactile and/or haptic means can also be used to provide notifications and/or recommendations to the driver.

Accordingly, a system for monitoring speed 10 has been advantageously provided herein. The system 10 is capable of assessing the current speed of a vehicle in relation to a predetermined and/or configurable speed threshold to notify the driver when the speed threshold is exceeded. The system 10 can additionally or alternatively provide a driver with a recommendation to further assist the driver in navigating a particular stretch of road or terrain.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A system for monitoring a speed of a vehicle driven by a driver, comprising:
    an imaging system onboard the vehicle and configured to provide image data based on current driving conditions and a current road type on which the vehicle is traveling;
    a controller configured to:
        analyze the image data and to generate a speed threshold;
        modify the speed threshold based on detection from the image data that a low visibility condition is present and the current road type on which the vehicle is traveling has changed, wherein the low visibility condition comprises at least one of a rain condition, a snow condition, and a fog condition, and wherein modification of the speed threshold further comprises determining the current road type is at least one of a motorway, a country road, and a city street; and compare the speed threshold with a current driving speed of the vehicle; and a rearview mirror assembly having a display system, the display system displaying at least one of a notification and a recommendation to the driver if the current driving speed exceeds the speed threshold.

2. The system of claim 1, wherein the controller is part of an exterior light control system.

3. The system of claim 1, wherein the controller generates the speed threshold based on a stopping distance, a perception to reaction time, a coefficient of friction, and a gravitational constant.

4. The system of claim 3, wherein the coefficient of friction is a dynamic variable and is reduced in value when the image data is indicative of the low visibility condition.

5. The system of claim 3, wherein the controller generates the speed threshold by solving the following equation:

$$D_s = vt_{pr} + \frac{v^2}{2\mu g}$$

where $D_s$ is the stopping distance, v is the speed threshold, $t_{pr}$ is the perception to reaction time, $\mu$ is the coefficient of friction, and g is the gravitational constant.

6. The system of claim 1, wherein the recommendation comprises a recommended driving speed.

7. A method for monitoring a speed of a vehicle, comprising:

providing image data from an imaging system located onboard the vehicle, wherein the image data is based on current driving conditions and a current road type on which the vehicle is traveling;

analyzing the image data;

generating a speed threshold;

modifying the speed threshold based on detection from the image data that a low visibility condition is present and the current road type on which the vehicle is traveling has changed, wherein the current road type is at least one of a motorway, a country road and a city street and the low visibility condition is at least one of a rain condition, a snow condition, and a fog condition;

comparing the speed threshold with a current driving speed of the vehicle; and displaying at least one of a notification and recommendation on a display system of a rearview mirror assembly if the current driving speed exceeds the speed threshold.

8. The method of claim 7, wherein the recommendation comprises a recommended driving speed.

9. The method of claim 7, further comprising the step of calculating the speed threshold based on a stopping distance, a perception to reaction time, a coefficient of friction, and a gravitational constant.

10. The method of claim 9, wherein the coefficient of friction is a dynamic variable and is reduced in value when the image data is indicative of the low visibility condition.

11. The method of claim 9, wherein the speed threshold is calculated by solving the following equation:

$$D_s = vt_{pr} + \frac{v^2}{2\mu g}$$

where $D_s$ is the stopping distance, v is the speed threshold, $t_{pr}$ is the perception to reaction time, $\mu$ is the coefficient of friction, and g is the gravitational constant.

12. A non-transitory computer readable medium having stored thereon software instructions executed by a processor, the software instructions comprising the steps of:

providing image data from an imaging system located onboard a vehicle, wherein the image data is based on current driving conditions and a current road type on which the vehicle is traveling;

analyzing the image data;

generating a speed threshold;

modifying the speed threshold based on detection from the image data that a low visibility condition is present and the current road type on which the vehicle is traveling has changed, wherein the current road type is at least one of a motorway, a country road and a city street and the low visibility condition is at least one of a rain condition, a snow condition, and a fog condition;

comparing the speed threshold with a current driving speed of the vehicle; and displaying at least one of a notification and recommendation on a display system of a rearview mirror assembly if the current driving speed exceeds the speed threshold.

13. The non-transitory computer readable medium of claim 12, wherein the recommendation comprises a recommended driving speed.

14. The non-transitory computer readable medium of claim 12, wherein the software instructions further comprise the step of calculating the speed threshold based on a stopping distance, a perception to reaction time, a coefficient of friction, and a gravitational constant.

15. The non-transitory computer readable medium of claim 14, wherein the software instructions further comprise the step of reducing a coefficient of friction when the image data is indicative of the low visibility condition.

16. The non-transitory computer readable medium of claim 14, wherein the speed threshold is calculated by solving the following equation:

$$D_s = vt_{pr} + \frac{v^2}{2\mu g}$$

where $D_s$ is the stopping distance, v is the speed threshold, $t_{pr}$ is the perception to reaction time, $\mu$ is the coefficient of friction, and g is the gravitational constant.

* * * * *